(12) United States Patent
Ishii (10) Patent No.: US 10,594,968 B2
(45) Date of Patent: Mar. 17, 2020

(54) IMAGE SENSOR AND IMAGING APPARATUS

(71) Applicant: CANON KABUSHIKI KAISHA, Tokyo (JP)

(72) Inventor: Mie Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/039,457

(22) Filed: Jul. 19, 2018

(65) Prior Publication Data

US 2019/0028664 A1    Jan. 24, 2019

(30) Foreign Application Priority Data

Jul. 21, 2017 (JP) ................. 2017-142106

(51) Int. Cl.
*H04N 5/355* (2011.01)
*H04N 5/363* (2011.01)
*H04N 5/359* (2011.01)
*H04N 5/3745* (2011.01)
*H04N 5/378* (2011.01)

(52) U.S. Cl.
CPC .......... *H04N 5/363* (2013.01); *H04N 5/3597* (2013.01); *H04N 5/35572* (2013.01); *H04N 5/37452* (2013.01); *H04N 5/378* (2013.01)

(58) Field of Classification Search
CPC .................................................. H04N 5/3559
USPC ......................................................... 348/241
See application file for complete search history.

(56) References Cited

U.S. PATENT DOCUMENTS

| | | | | |
|---|---|---|---|---|
| 9,332,200 | B1* | 5/2016 | Hseih ................. | H04N 5/363 |
| 2007/0001101 | A1* | 1/2007 | Sundararaman ..... | H04N 3/1512 |
| | | | | 250/214 R |
| 2010/0118173 | A1* | 5/2010 | Toros ................. | H01L 27/14603 |
| | | | | 348/302 |
| 2012/0002089 | A1* | 1/2012 | Wang ................. | H01L 27/14603 |
| | | | | 348/297 |
| 2013/0135486 | A1* | 5/2013 | Wan .................. | H04N 5/765 |
| | | | | 348/207.99 |
| 2015/0055761 | A1* | 2/2015 | Tredwell .............. | G01T 1/247 |
| | | | | 378/207 |

FOREIGN PATENT DOCUMENTS

| | | | |
|---|---|---|---|
| JP | 2002-027326 A | 1/2002 | |
| JP | 4678824 B2 | 4/2011 | |
| JP | 2012231421 A | * 11/2012 | ............. H04N 5/367 |

* cited by examiner

*Primary Examiner* — Anthony J Daniels
(74) *Attorney, Agent, or Firm* — Cowan, Liebowitz & Latman, P.C.

(57) ABSTRACT

An image sensor includes a unit pixel that includes a photoelectric converter configured to accumulate electric charges generated based on incident light, and an electric charger configured to store the electric charges transferred from the photoelectric converter, and a corrector configured to correct a signal corresponding to the electric charges output from the electric charger based on a transfer condition when the electric charges are transferred from the photoelectric converter to the electric charger.

13 Claims, 10 Drawing Sheets

IMAGE SENSOR AND IMAGING APPARATUS

BACKGROUND OF THE INVENTION

Field of the Invention

The present invention relates to an image sensor and an imaging apparatus.

Description of the Related Art

A recent digital single-lens reflex camera and a video camera often use a CMOS image sensor. The CMOS image sensor has been developed and required for many pixels, fast imaging, and high ISO speed. Most of recent CMOS image sensors have more than ten million pixels.

The CMOS image sensor has a photodiode ("PD" hereinafter) for each pixel, and the electric charges stored in the PD are transferred to an electric charger and sequentially read via an output line from the electric charger. When the electric charges are transferred to the electric charger from the PD, the incomplete transfer that cannot transfer all the electric charges is likely to occur. An optimization of the manufacturing condition, such as a concentration of a charge transfer path, is necessary for the complete transfer. However, as the pixel pitch reduces due to the increased pixel number, the optimization control becomes very difficult and the incomplete transfer of some electrons may occur due to slight errors. The incomplete transfer deteriorates the output value characteristic (linearity) that should originally be proportional to the incident light quantity.

Japanese Patent No. 4,678,824 discloses an imaging apparatus that adds an offset correction amount for correcting a charge loss caused by the incomplete transfer to an electric signal generated from the image sensor. Japanese Patent Laid-Open No. 2002-27326 discloses a digital camera that enables a captured state to be live-view confirmed by repeating the transfer from the PD to the electric charger and a nondestructive readout from the electric charger.

The imaging apparatus disclosed in Japanese Patent No. 4,678,824 changes an offset correction value in accordance with the imaging sensitivity considering the influence of the incomplete transfer different from the imaging sensitivity. Since the influence of the incomplete transfer is different according to the voltage value in the transfer, the transfer pulse slope, and the temperature in imaging, it is insufficient to change the offset correction value based only on the imaging sensitivity.

In the digital camera disclosed in Japanese Patent Laid-Open No. 2002-27326, a plurality of charge transfers from the PD increase the influence of the incomplete transfer in comparison with a single charge transfer. For example, the charge remaining amount associated with two charge transfers is twice as large as that with the single charge transfer. As a result, the increased transfer number deteriorates the obtained image quality.

SUMMARY OF THE INVENTION

The present invention provides an image sensor and an imaging apparatus, which can restrain the image quality from degrading.

An image sensor according to one aspect of the present invention includes a unit pixel that includes a photoelectric converter configured to accumulate electric charges generated based on incident light, and an electric charger configured to store the electric charges transferred from the photoelectric converter, and a corrector configured to correct a signal corresponding to the electric charges output from the electric charger based on a transfer condition when the electric charges are transferred from the photoelectric converter to the electric charger.

Further features of the present invention will become apparent from the following description of exemplary embodiments with reference to the attached drawings.

DESCRIPTION OF THE EMBODIMENTS

Referring now to the accompanying drawings, a detailed description will be given of embodiments of the present invention. Corresponding elements will be designated by the same reference numerals, and a duplicate description thereof will be omitted.

Figure 1:
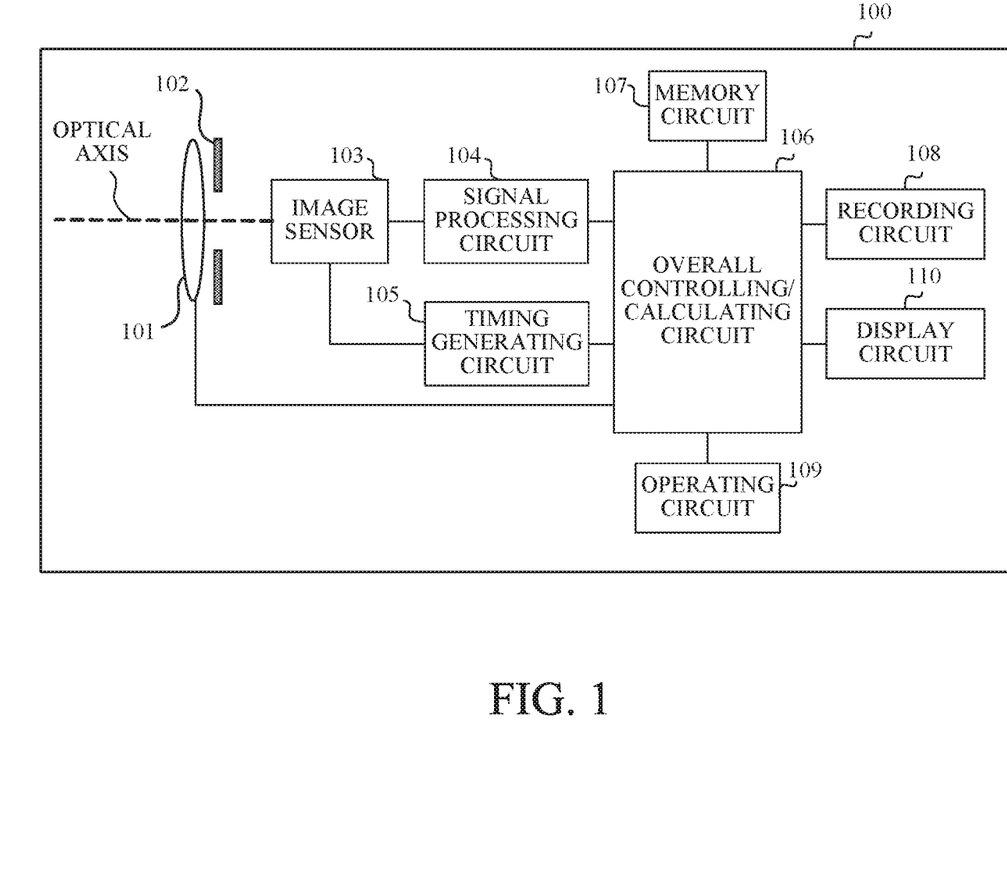
FIG. 1 is a block diagram of an imaging apparatus according to an embodiment of the present invention.

FIG. 1 is a block diagram of an imaging apparatus 100 according to this embodiment of the present invention. The imaging apparatus 100 includes an imaging lens 101 and a diaphragm (aperture stop) 102 in an imaging optical system. The light that has passed the imaging lens 101 and the diaphragm 102 forms an image near a focal position of the imaging lens 101. The imaging lens 101 is illustrated as a single lens but may actually include a plurality of lenses. The imaging optical system may be fixed onto the imaging apparatus 100 but may be detached from and attached to it.

An image sensor 103 is a CMOS image sensor that converts an object image formed by the imaging lens 101 into an electric signal and a processable image signal in accordance with the light quantity. A signal processing circuit 104 performs a variety of corrections, such as a signal amplification and a reference level adjustment, and data sorting for an image signal output from the image sensor 103. A timing generating circuit 105 outputs a drive timing signal to the image sensor 103 and the signal processing circuit 104.

An overall controlling/calculating circuit 106 integrally drives and controls the entire imaging apparatus 100 that includes the image sensor 103 and the signal processing circuit 104. The overall controlling/calculating circuit 106 performs predetermined image processing and a defect correction for the image signal output from the signal processing circuit 104. A memory circuit 107 and a recording circuit 108 include a nonvolatile memory or a recording medium, such as a memory card, for storing the image signal etc. output from the overall controlling/calculating circuit 106. An operating circuit 109 accepts a signal from an operating member provided to the imaging apparatus 100 and reflects a command by a user on the overall controlling/calculating circuit 106. The display circuit 110 displays a captured image, a live-view image, and a variety of setup screens, etc.

Figure 2:
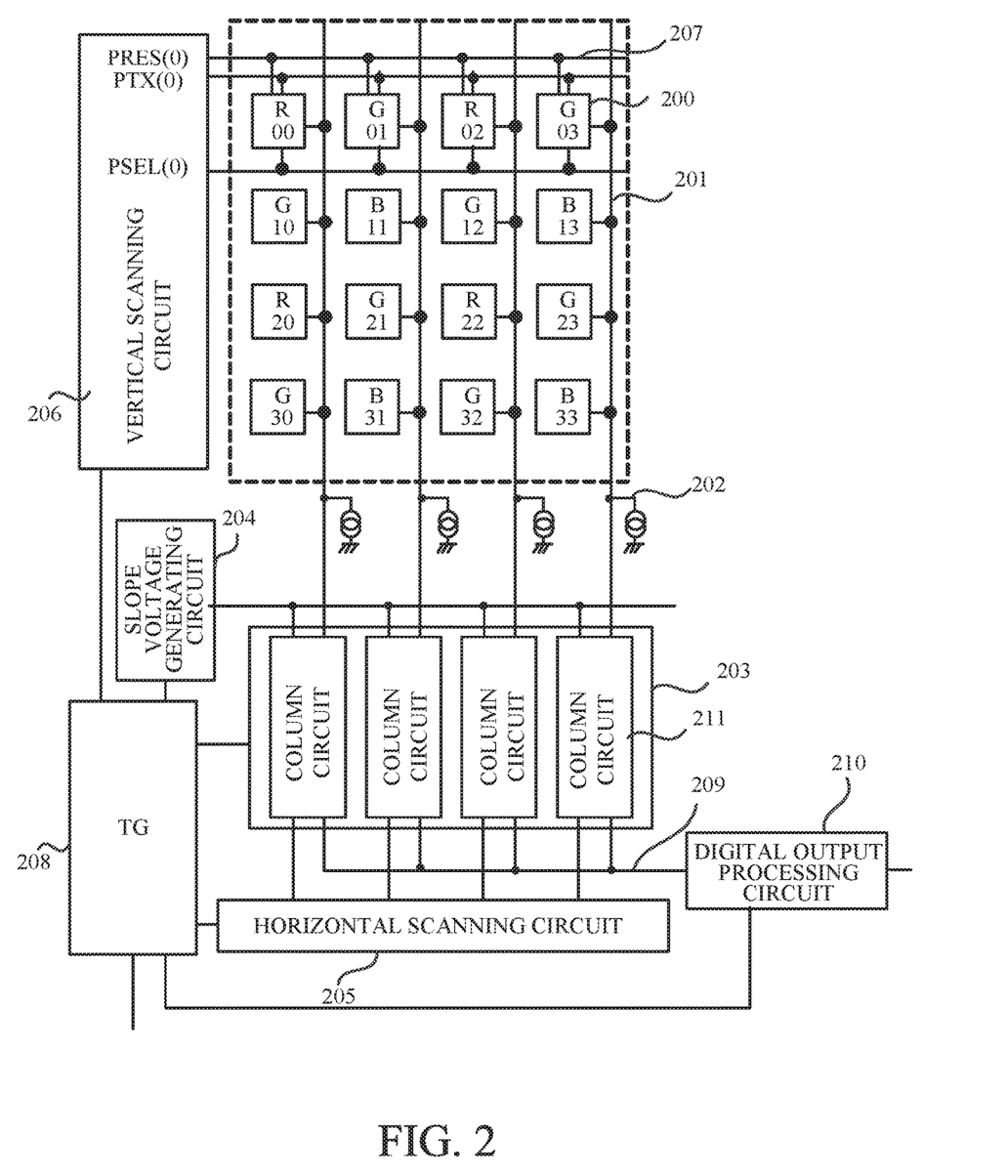
FIG. 2 is a block diagram in an image sensor.

FIG. 2 is a block diagram of the image sensor 103. The image sensor 103 has a plurality of unit pixels 200 arranged in a matrix shape. FIG. 2 illustrates 4×4 or 16 unit pixels 200, but millions of unit pixels 200 are actually arranged. The unit pixels 200 include color filters of R (red), G (green), and B (blue) in the Bayer array. A letter and numeral in the unit pixel 200 represent a color and address of the pixel. For example, G01 represents a G (green) pixel at the $0^{th}$ row and $1^{st}$ the column. The unit pixel 200 outputs an image signal to a column output line 201. The column output line 201 is connected to a current source 202.

A read circuit 203 has a plurality of column circuits 211. The column circuits 211 performs an analog-to-digital conversion (AD conversion) for an image signal input from the column output line 201. A slope voltage generating circuit 204 generates a slope voltage in which the potential varies at a constant variation rate over time used for the AD conversion in a column circuit 211.

The signal AD-converted by the column circuit 211 is sequentially output to the outside of the image sensor 103 via a horizontal output line 209 and a digital output processing circuit 210 as the horizontal scanning circuit 205 is driven. A vertical scanning circuit 206 selects a row and drives the unit pixel 200 via a signal line 207 connected for each row of the unit pixel 200. In FIG. 2, the signal line 207 is connected only to the unit pixel 200 at the $0^{th}$ row but is actually wired to each row. A timing generator (TG) 208 sends a signal to and controls driving of a variety of circuits, such as the read circuit 203, the slope voltage generating circuit 204, the horizontal scanning circuit 205, the vertical scanning circuit 206, and the digital output processing circuit 210.

First Embodiment

Figure 3:
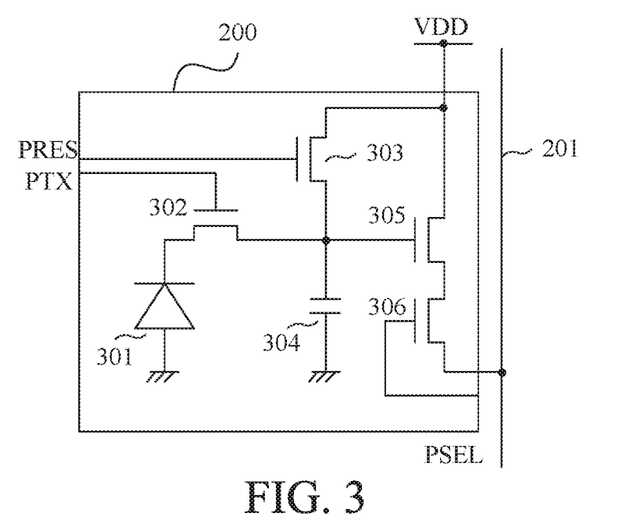
FIG. 3 illustrates a circuit structure of a unit pixel in an image sensor according to a first embodiment.

FIG. 3 illustrates an illustrative circuit structure of the unit pixels 200 in the image sensor 103. A photodiode (photoelectric converter or "PD" hereinafter) 301 generates the electric charges based on incident light, and accumulates the generated electric charges. According to this embodiment, the PD 301 generates the electric charges in response to the object image formed by the imaging lens 101 and accumulates the generated electric charges. The electric charges accumulated by the PD 301 are transferred to a floating diffusion part ("FD" hereinafter) 304 as the electric charger via a transfer MOS transistor ("transfer switch" hereinafter) 302. When a selection switch 306 turns on, a voltage signal (pixel signal) representing the voltage corresponding to the electric charges transferred to the FD 304 is output to the column output line 201 via an amplification MOS transistor ("SF" hereinafter) 305 forming a source follower amplifier. The selection switch 306 is controlled every row in the unit pixel 200, and the pixel signals at the selected row are collectively output to the column output line 201 for each column. The reset MOS transistor ("reset switch" hereinafter) 303 resets the potential in the FD 304 and the potential in the PD 301 via the transfer switch 302 to VDD.

The electric charges transferred to the FD 304 are stored by the FD 304 unless it is reset by the reset switch 303. When the electric charges accumulated by the PD 301 are transferred to the FD 304 that has already stored the electric charges, the electric charges transferred to the PD 301 are superimposed on or added to the electric charges that have already stored by the FD 304.

The transfer switch 302, the reset switch 303, and the selection switch 306 are controlled by control signals PTX, PRES, and PSEL via the signal line 207 connected to the vertical scanning circuit 206.

Figure 4:
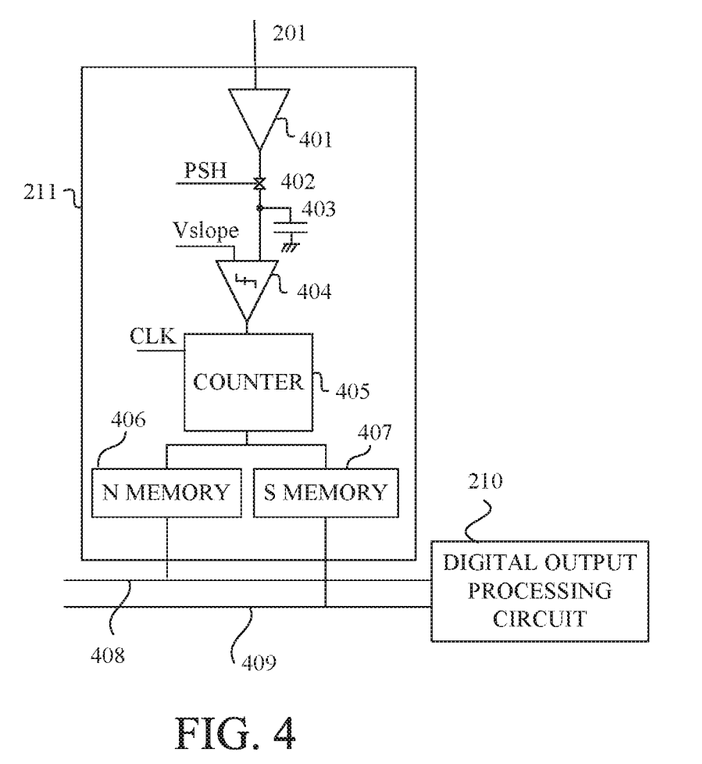
FIG. 4 illustrates a structure of a column circuit in the image sensor.

Referring now to FIG. 4, a description will be given of the column circuit 211 that constitutes the read circuit 203. FIG. 4 illustrates an illustrative stmcture of the column circuit 211.

An amplifier 401 amplifies the pixel signal input from the column output line 201. A capacitor 403 is used to store the signal voltage. Writing in the capacitor 403 is controlled when a control signal PSH turns on and off a switch 402.

A slope voltage (Vslope) as a reference voltage supplied from the slope voltage generating circuit 204 is input to one input terminal in a comparator 404. An output of the amplifier 401 written in the capacitor 403 is input to the other input terminal in the comparator 404. The comparator 404 compares the output of the amplifier 401 and the slope voltage Vslope with each other, and outputs one of two values (binary), i.e., a IOW level and a high level, depending on the comparison result. More specifically, the comparator 404 outputs the low level when the slope voltage Vslope is smaller than the output of the amplifier 401, and outputs the high level when the slope voltage Vslope is larger than the output of the amplifier 401. When the slope voltage Vslope starts transferring, a clock ("CLK" hereinafter) starts. A counter 405 counts up the count value in response to the CLK when an output COMP of the comparator 404 has a high level, and stops an operation as soon as the output COMP of the comparator 404 inverts to the low level (as soon as the comparison result inverts).

An N memory 406 holds a digital signal made by AD-converting the reset level signal ("N signal" hereinafter) of the FD 304. An S memory 407 holds a digital signal made by AD-converting the signal ("S signal" hereinafter) in which the signal of PD 301 is superimposed on the N signal of the FD 304.

The N signal and the S signal are output to the digital output processing circuit 210 via horizontal output lines 40l and 409 by the control signal from the horizontal scanning circuit 205. The digital output processing circuit 210 outputs a differential signal (light component) in which the N signal (the reset noise component in the FD 304) that causes noises is removed from the S signal.

A description will now be given of the charge read operation from the unit pixel 200 for one row in the image sensor 103. The image sensor 103 according to this embodiment has a single transfer mode for reading the signal after the electric charges are transferred from the PD 301 to the FD 304 once, and a multiple transfers mode for reading the signal after the electric charges are transferred a plurality of times.

Figure 5:
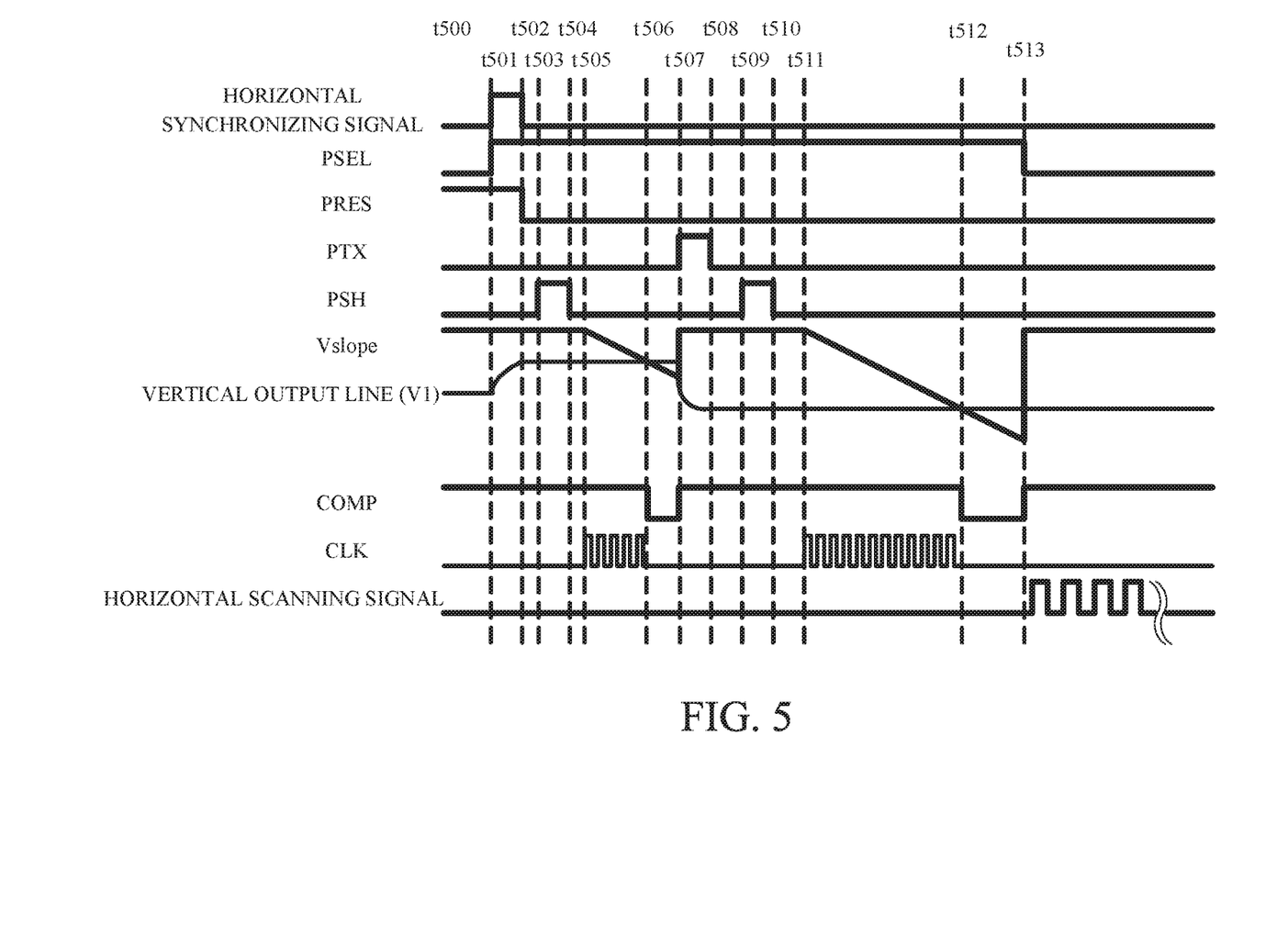
FIG. 5 is a timing chart of a charge read operation in a single transfer mode.

FIG. 5 is a timing chart of the illustrative charge read operation in the single transfer mode. The timing of each control signal, the slope voltage Vslope, CLK, and the horizontal scanning signal are schematically illustrated. The voltage V1 in the vertical output line output from the amplifier 401 and the output COMP from the comparator 404 are also illustrated at each timing.

At time t500, prior to the reading of the signal from the PD 301, the control signal PRES for the reset switch 303 is set to a high level. Thereby, a gate of the SF 305 is reset by the rest power voltage.

At time t501, the control signal PSEL for the selection switch 306 is set to a high level, and the SF 305 is activated.

At time t502, the control signal PRES is set to a low level, and the FD 304 is released from being reset. The voltage signal output from the FD 304 is read as the N signal to the column output line 201 and input to the column circuit 211.

At time t503 and time t504, the control signal PSH is sequentially set to a high level and a low level so as to turn on and off the switch 402. Thereby, the N signal that is gain-amplified by the amplifier 401 is stored by the capacitor 403. The signal value of the N signal stored by the capacitor 403 is input to the one input terminal of the comparator 404.

From time t505 to time t507, the slope voltage generating circuit 204 decreases the slope voltage Vslope from an initial value over time. At time t505, when the slope voltage Vslope starts transferring, CLK is supplied to the counter 405. The count value in the counter 405 increases in accordance with the number of CLKs. At time t506, when the slope voltage Vslope input to the comparator 404 has the same value as the signal value of the N signal, the output COMP of the comparator 404 has a low level and the counter 405 stops operating. The count value when the counter 405 stops operating, the N signal has an AD converted value and is stored in the N memory 406.

At time t507 and time t508, the control signal PTX is sequentially set to a high level and a low level so as to transfer the electric charges accumulated in the PD 301 to the FD 304. The voltage signal output from the FD 304 that changes according to a charge amount is read out as the S signal to the column output line 201 and input to the column circuit 211.

At time t509 and time t510, the control signal PSH is sequentially set to a high level and a low level so as to turn on and off the switch 402. Thereby, the capacitor 403 stores the S signal gain-amplified by the amplifier 401. The signal value of the S signal stored in the capacitor 403 is input to one input terminal in the comparator 404.

From time t511 to time t513, the slope voltage generating circuit 204 decreases the slope voltage Vslope from the initial value over time. At time t511, when the slope voltage Vslope starts transferring, CLK is supplied to the counter 405. The counter value of the counter 405 increases in accordance with the number of CLKs. At time t512, when the slope voltage Vslope input to the comparator 404 has the same value as the signal value of the S signal, the output COMP of the comparator 404 has a low level and the counter 405 stops operating. The counter value when the counter 405 stops operating is the AD-converted value of the S signal and stored in the S memory 407.

Following time t513, the horizontal scanning circuit 205 sequentially operates the column circuit 211 and the signals stored in the N memory 406 and the S memory 407 are output to the digital output processing circuit 210 via the horizontal output lines 408 and 409. The digital output processing circuit 210 outputs the calculated differential signal to the outside of the image sensor 103 after calculating the differential signal by subtracting the N signal from the S signal.

Figure 6:
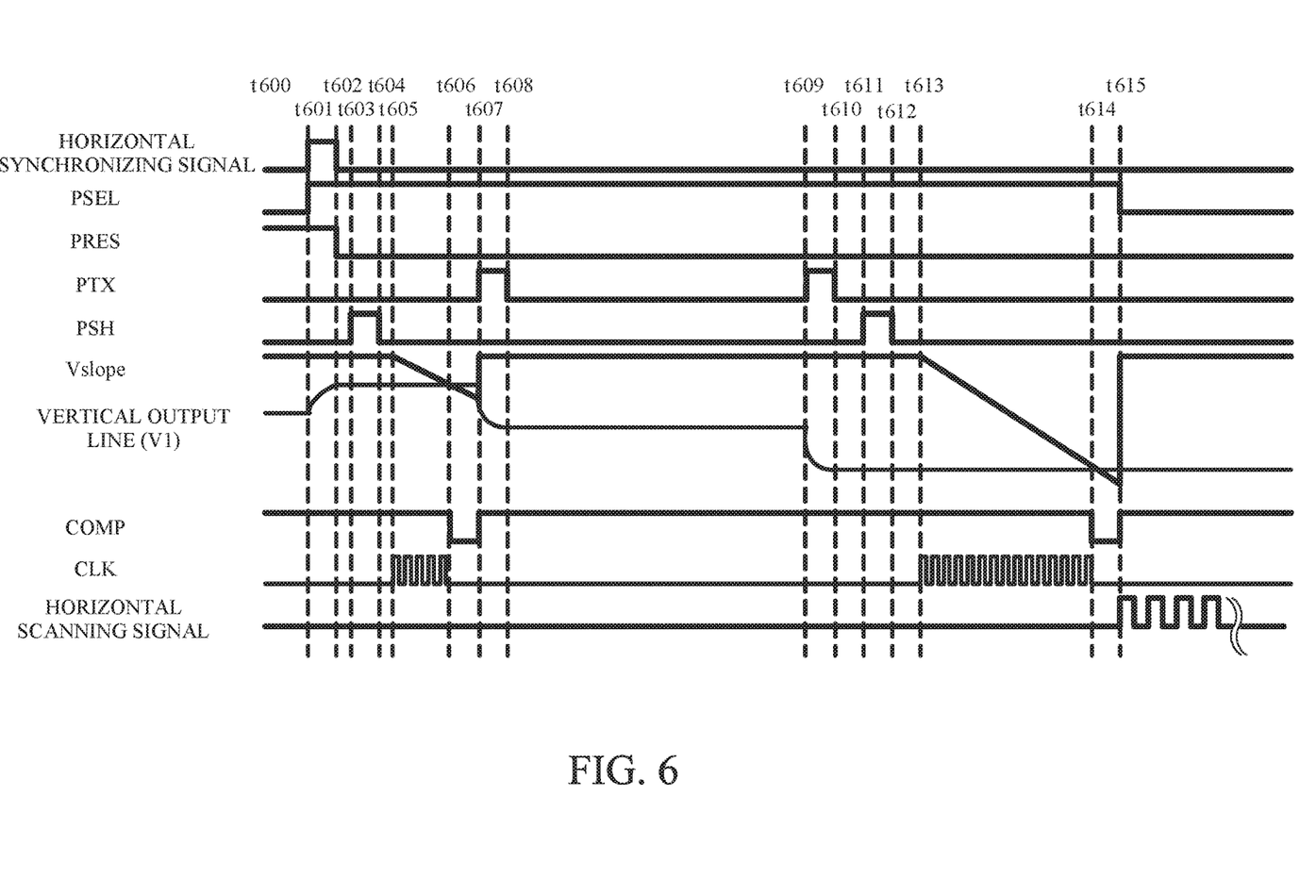
FIG. 6 is a timing chart of a charge read operation in a multiple transfers mode.

FIG. 6 is a timing chart of an illustrative charge read operation in the multiple transfers mode. The operation from time t600 to time t608 is similar to that from time t500 to t508 in FIG. 5, and a description thereof will be omitted.

At time t609 and time t610, the control signal PTX is again sequentially set to a high level and a low level so as to transfer the electric charges accumulated in PD 301 to the FD 304 from time t608 to time t610. The control signal PRES is maintained to be a low level in the first charge transfer from time t607 to time t608 and the second charge transfer from time t609 to time t610 and no resets are performed. Hence, the second transferred electric charges are superimposed on the electric charges first transferred and stored in the FD 304. The voltage signal output from the FD 304 that changes with the charge amount is read as the S signal to the column output line 201 and input to the column circuit 211.

At time t611 and rime 612, the control signal PSH is sequentially set to a high level and a low level so as to turn on and off the switch 402. Thereby, the S signal gain-amplified by the amplifier 401 is stored in the capacitor 403. The signal value of the S signal stored in the capacitor 403 is input to the one input terminal in the comparator 404.

The operation from time t613 to time t615 is similar to that from time t511 to time t513 in FIG. 5 and the AD-converted value of the S signal is stored in the S memory 407.

The charge read operation in the multiple transfers mode according to this embodiment reads the S signal only after the second charge transfer but may read it after the first charge transfer. Since the multiple transfers and read operation are repeated for each row, the one-frame read time becomes long. The charge accumulating time to the PD 301 between the first transfer and the second transfer cannot be longer. Hence, the image sensor 103 may include a read circuit for each pixel rather than a read circuit for each column described in FIG. 2. After the electric charges are transferred, the next charge transfer may be performed at the read time.

Figure 7:
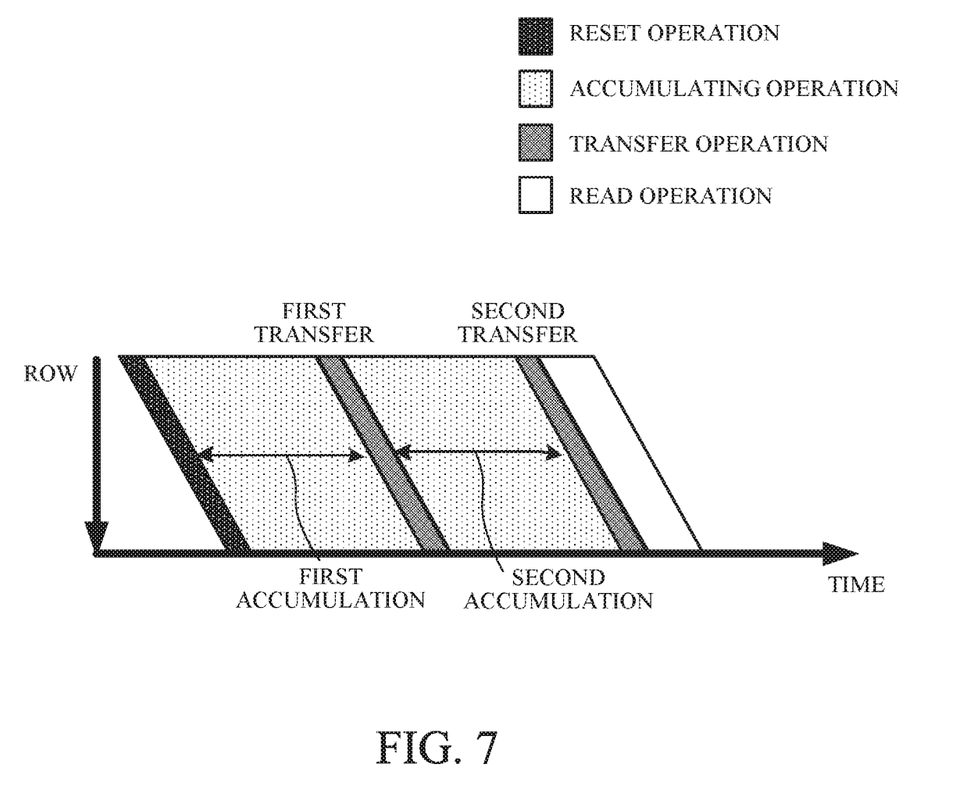
FIG. 7 schematically illustrates a driving operation of multiple transfers according to the first embodiment.

FIG. 7 schematically illustrates a driving operation example in the multiple transfers. The abscissa axis denotes time, and the ordinate axis denotes a row position in the image sensor 103.

As the image capture starts, the vertical scanning circuit 206 sequentially sends the control signals PRES and PTX to all rows and performs pixel reset operation. After the reset operation, the accumulation operation starts. After the first accumulation operation (after the accumulation time T1 passes), the control of the control signal PTX provides the first charge transfer from PD 301 to FD 304. Moreover, the second charge transfer and the S signal read operation are performed after the second accumulation operation (after the accumulation time T2 passes).

However, this driving operation cannot read the N signal before the S signal is read. Accordingly, the N signal data is previously stored so as to remove noises and a difference between the obtained S signal and the stored N signal may be calculated. In this driving operation, it is a long time for the FD 304 to store the electric charges and thus the FD 304 may be shielded from light.

As illustrated in FIG. 7, the first charge transfer is previously executed and the second charge transfer and the S signal read operation are executed. Thereby, the multiple transfers can be executed without influencing the one-frame ead time. This embodiment describes two transfers but may increase the number of transfers by repeating the similar operation.

The multiple transfers are very effective to a large exposure amount in a pixel structure in which the PD 301 has a small area and the FD 304 has a large capacitance. Even when the generated charge amount reaches the storable charge amount in the PD 301, the PD 301 can transfer the accumulated charges to the FD 304 and again accumulate the electric charges so as to expand the detectable exposure amount (dynamic range).

As described above, the multiple transfers are effective in expanding the dynamic range. On the other hand, the charge transfer from the PD 301 to the FD 304 has an incomplete transfer, and the influence increases as the transfer number increases.

Figure 8A:
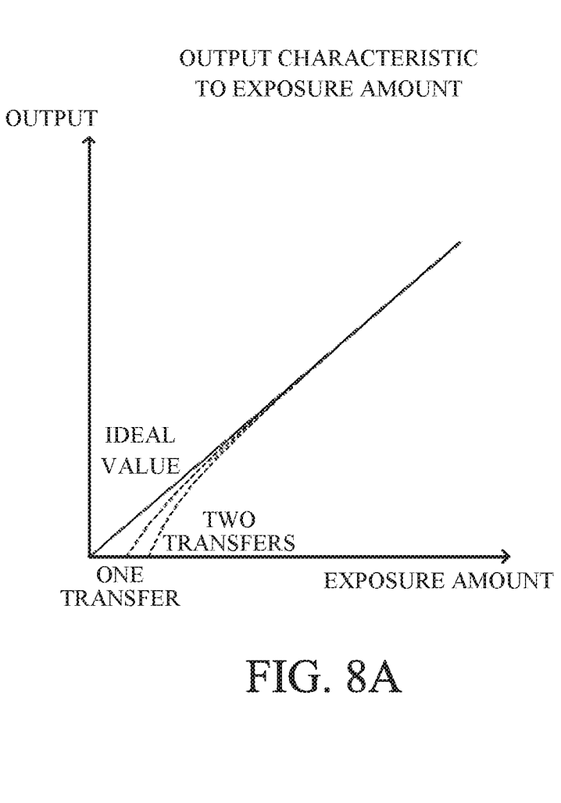
FIGS. 8A and 8B illustrate a signal output characteristic example and a corrected output example.

FIG. 8A is a graph of an illustrative output characteristic to the exposure amount for each transfer number. The abscissa axis denotes an exposure amount, and the ordinate axis denotes an output value. As illustrated by a straight line, it is ideal that the output line is proportional to the exposure amount. However, actually, the output value is smaller than the ideal value under the condition having a small exposure amount due to the influence of the electric charge return caused by the incomplete transfer. This influence increases as the transfer number increases. The output characteristic deterioration to the exposure amount can be corrected to the ideal line by the corrective processing. For example, the corrected output value y ($=\alpha x+\beta$) may be calculated for the acquired output value x by using a correction coefficient (a gain value $\alpha$ used for the gain correction and an offset value $\beta$ used for the offset correction). The gain value $\alpha$ and the offset value $\beta$ are coefficients arbitrarily set based on the characteristic of the image sensor.

Figure 8B:
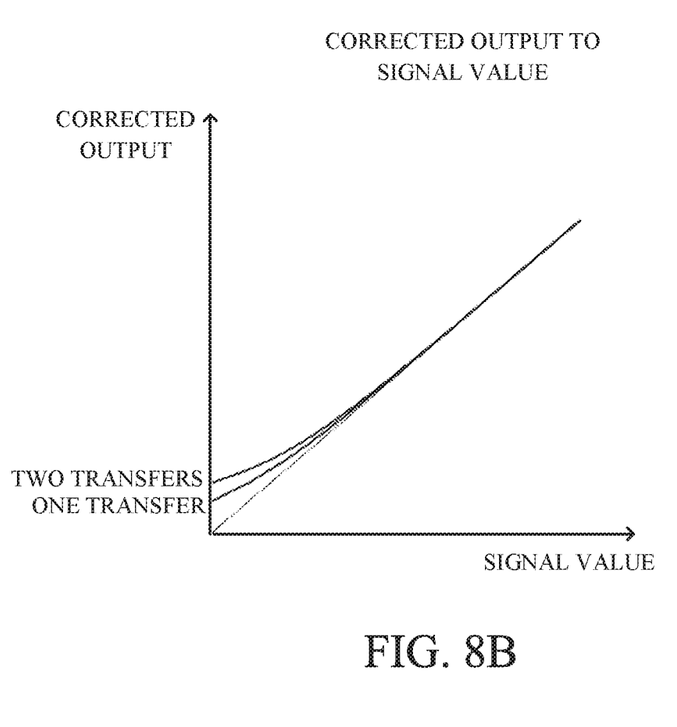

The digital output processing circuit 210 according to the present invention changes the correction amount to the acquired output value in accordance with the transfer number by considering the output characteristic that changes according to the transfer number. In this embodiment, the digital output processing circuit 210 changes the correction coefficient in accordance with the transfer number. More specifically, the digital output processing circuit 210 corrects the offset $\beta$ so that the offset $\beta$ for two transfers is larger than that for a single transfer. FIG. 8B is a graph of the corrected output value to the acquired output value. In order to change the correction coefficient in accordance with the transfer number, the corrected output value is different according to the transfer number even when the output value is the same. This correction can acquire the output value to the exposure amount close to the ideal value illustrated in FIG. 8A.

This embodiment instructs the digital output processing circuit 210 to provide this correction but may use the signal processing circuit 104 in the imaging apparatus 100 for the corrector.

The incomplete transfer characteristic also depends on the layout in the image sensor 103, and is different according to areas on the same imaging plane of the image sensor 103. Accordingly, the correction coefficient may be variable in accordance with areas on the imaging plane. For example, the correction coefficient is previously stored for each of the transfer number and area and may be changed in accordance with the driving condition of the read signal and the pixel address.

Since the transfer characteristic changes according to the temperature in imaging, the voltage in a transfer, the transfer time, and the transfer pulse slope, the correction coefficient may be changed according to the above condition. In other words, even in the single transfer mode, the correction coefficient may be changed according to the temperature in imaging, the voltage in the transfer, and the transfer pulse slope. Since the influence of the incomplete transfer depends on the exposure amount as illustrated in FIGS. 8A and 8B, the operation may be actively performed for the imaging condition in a scene with a high ISO speed and a small exposure amount.

As described above, a high-quality image can be obtained by changing the correction coefficient for the obtained signal in accordance with the transfer condition such as a charge transfer number from the PD 301 to the FD 304 as the electric charger.

Second Embodiment

Figure 9:
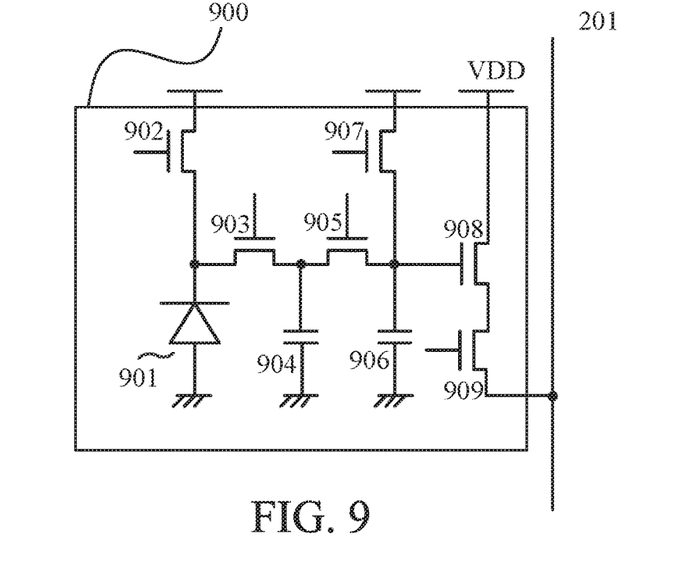
FIG. 9 illustrates a circuit structure of a unit pixel in an image sensor according to a second embodiment, FIG. 10 schematically illustrates a driving operation of multiple transfers according to the second embodiment.

The imaging apparatus according to this embodiment has a similar structure as that of the imaging apparatus 100 according to the first embodiment. This embodiment is different from the first embodiment in pixel structure. A unit pixel 900 according to this embodiment includes a pixel memory (memory part) as an electric charger between the photodiode and the floating diffusion part. The pixel memory enables the global shutter driving and smooth multiple transfers.

FIG. 9 illustrates one illustrative circuit configuration of the unit pixel 900. A photodiode (photoelectric converter, "PD" hereinafter) 901 receives an object image formed by the imaging lens 101, generates the electric charges, and accumulates the generated electric charges. A reset switch 902 resets the PD 901. The electric charges accumulated by the PD 901 are transferred to a pixel memory 904 as the electric charger via a transfer switch 903. The electric charges stored in the pixel memory 904 are transferred to a floating diffusion part ("FD" hereinafter) 906 via a transfer switch 905. When a selection switch 909 turns on, the voltage signal (pixel signal) representing the voltage corresponding to the electric charges transferred to the FD 906 is output to the column output line 201 via an SF 908. The selection switch 909 is controlled in a row unit of the unit pixel 900, and the pixel signals at the selected row are simultaneously output to the column output line 201 of each column. A reset MOS transistor ("reset switch" hereinafter) 908 resets the potential of the FD 906 and the potential of the pixel memory 904 via the transfer switch 905 to VDD. When the transfer switch 903 simultaneously turns on, the electric charges of the PD 901 can be reset, but when the reset switch 902 is turned on, the electric charges of the PD 901 can be reset while the pixel memory 904 stores the electric charges.

The transfer switch 905, the reset switch 907, and the selection switch 909 are controlled by the control signals PTX, PRES, and PSEL via the signal line 207 connected to the vertical scanning circuit 206. The reset switch 902 and the transfer switch 903 are controlled by the control signals PRES1 and PTX1, respectively.

Figure 10:
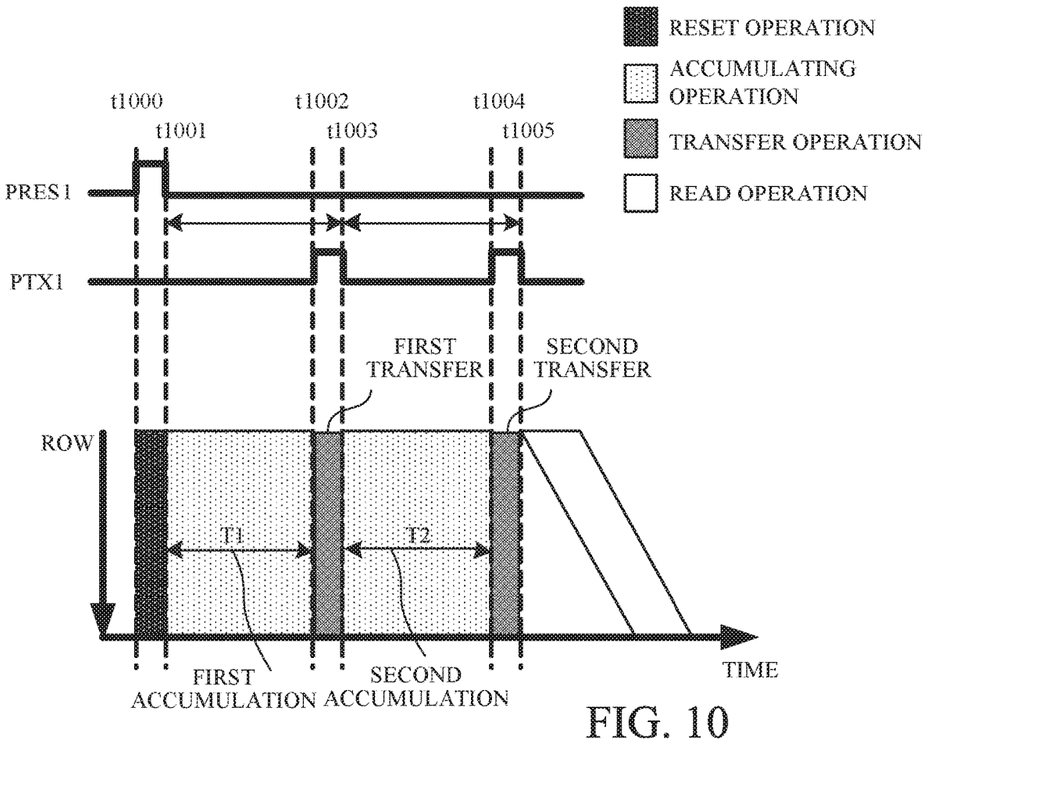

FIG. 10 schematically one illustrative driving operation of the multiple transfers in the image sensor 103 according to this embodiment. The abscissa axis denotes time, and the ordinate axis denotes the row position in the image sensor 103.

At time t1000, the vertical scanning circuit 206 sends the control signals PRES1 and PTX1 to all rows when the image capture starts, and the pixels are reset. The vertical scanning circuit 206 simultaneously sends the control signals PRES and PTX to all rows to reset the image memory 904 and the FD 906.

At time t1001, the first accumulation operation starts for all rows simultaneously.

After the first accumulation operation (after the accumulation time T1 passes), the control by the control signal PTX1 from the time t1002 to time t1003 performs the first charge transfer to all rows simultaneously from the PD 901 to the pixel memory 904.

At time t1003, the second accumulation operation starts for all rows simultaneously.

After the second accumulation operation (after the accumulation time T2 passes), the control by the control signal PTX1 from the time t1004 to time t1005 performs the second charge transfer.

After time t1005, the read operation is sequentially performed. The electric charge stored in the pixel memory 904 can be read in accordance with the timing chart in FIG. 5. This embodiment transfers the electric charges from the pixel memory 904 to the FD 906 rather than the charge transfer from the PD 301 to the FD 304.

This embodiment describes two transfers but may perform reading after the first charge transfer in the single transfer mode or may increase the transfer number.

The unit pixel 900 according to this embodiment includes the pixel memory 904 and performs the global shutter driving that provides simultaneous accumulations for all rows and sequential reading. This embodiment stores the electric charges in the pixel memory 904 and then reads them from the FD 906. Thereby, prior to reading the S signal, the N signal of the FD 906 can be read out. The noises can be accurately removed and a high-quality image can be acquired.

The structure of this embodiment suffers from the incomplete transfer in the charge transfer from the PD 901 to the pixel memory 904, and the influence increases as the transfer number increases. Hence, this embodiment executes the correction processing described with reference to FIGS. 8A to 8B. The output value can be corrected suitable for each transfer characteristic by changing the correction coefficient in accordance with the transfer number from the PD 901 to the pixel memory 904, and a high-quality image can be acquired.

Since the transfer characteristic changes according to the voltage in the transfer and the transfer pulse slope in this embodiment, the correction coefficient may be changed according to the above condition.

As described above, the high-quality image can be obtained by changing the correction coefficient to the signal obtained according to the transfer condition, such as the electric charge transfer number from the PD 901 to the pixel memory 904 as the electric charger.

(Variation)

Figure 11:
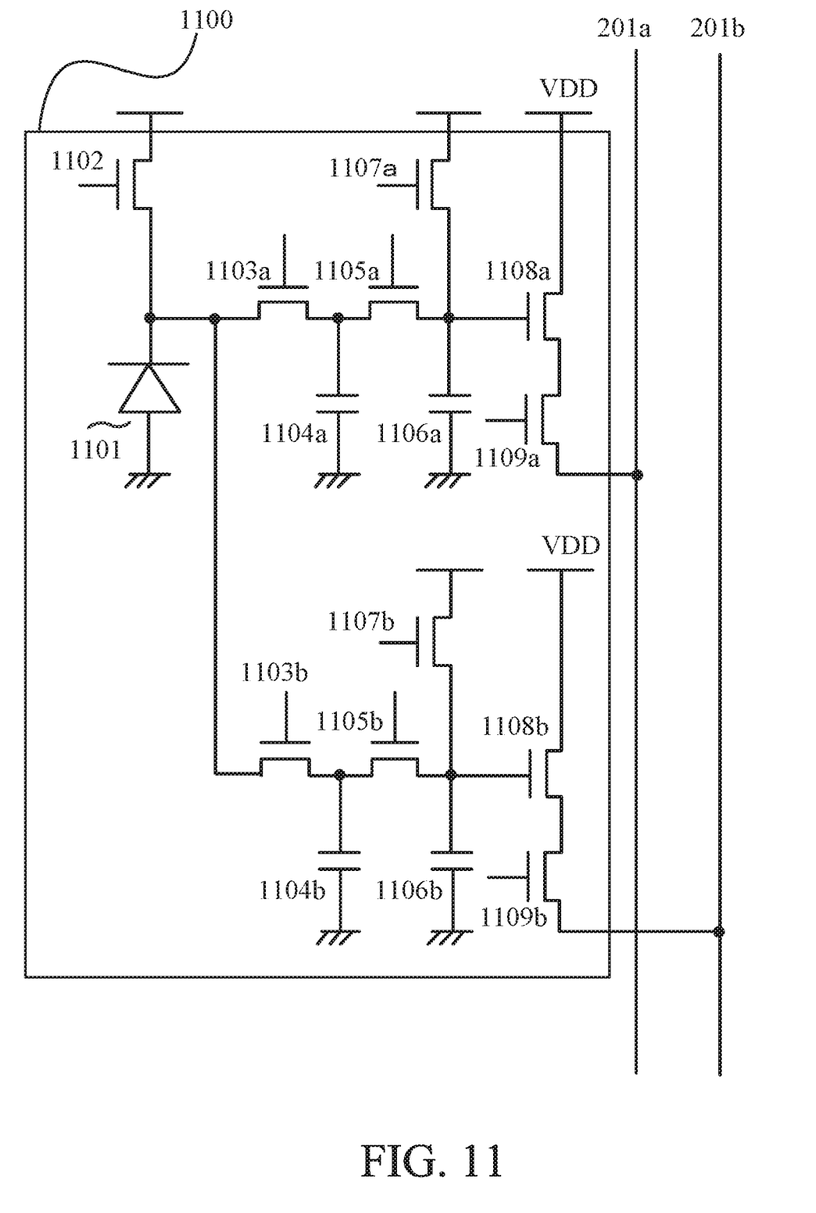
FIG. 11 illustrates a pixel circuit of a unit pixel in an image sensor according to a variation of the second embodiment.

FIG. 11 illustrates an illustrative circuit configuration of a unit pixel 1100 in the image sensor 103 according to a variation of the second embodiment. The unit pixel 1100 includes two pixel memories for one PD.

A photodiode (photoelectric converters, "PD" hereinafter) 1101 receives an object image formed by the imaging lens 101, generates the electric charges, and accumulates the generated electric charges. A reset switch 1102 resets the PD 1101. The electric charges accumulated in the PD 1101 are transferred to pixel memories 1104a and 1104b as electric chargers via transfer switches 1103a and 1103b. The unit pixel 1100 includes a transfer switch 1105a, an FD 1106a, a reset switch 1107a, an SF 1108a, and a selection switch 1109a corresponding to the pixel memory 1104a. The voltage signal representing the voltage corresponding to the electric charges transferred to the FD 1106a are output to the column output line 201a. The unit pixel 1100 includes a transfer switch 1105b, an FD 1106b, a reset switch 1107b, an SF 1108b, and a selection switch 1109b corresponding to the pixel memory 1104b. The voltage signal representing the voltage corresponding to the electric charges transferred to the FD 1106b are output to the column output line 201b.

The control signal PTX1 for controlling the transfer switches 1105a and 1105b can determine which of the pixel memories 1104-1 and 1104-2 the electric charges are transferred to. The control signals PRES, PSEL, and PTX also control reading of the electric charges.

The unit pixel 1100 that includes two pixel memories for one PD provides a variety of global shutter drives to the image sensor 103.

Figure 12:
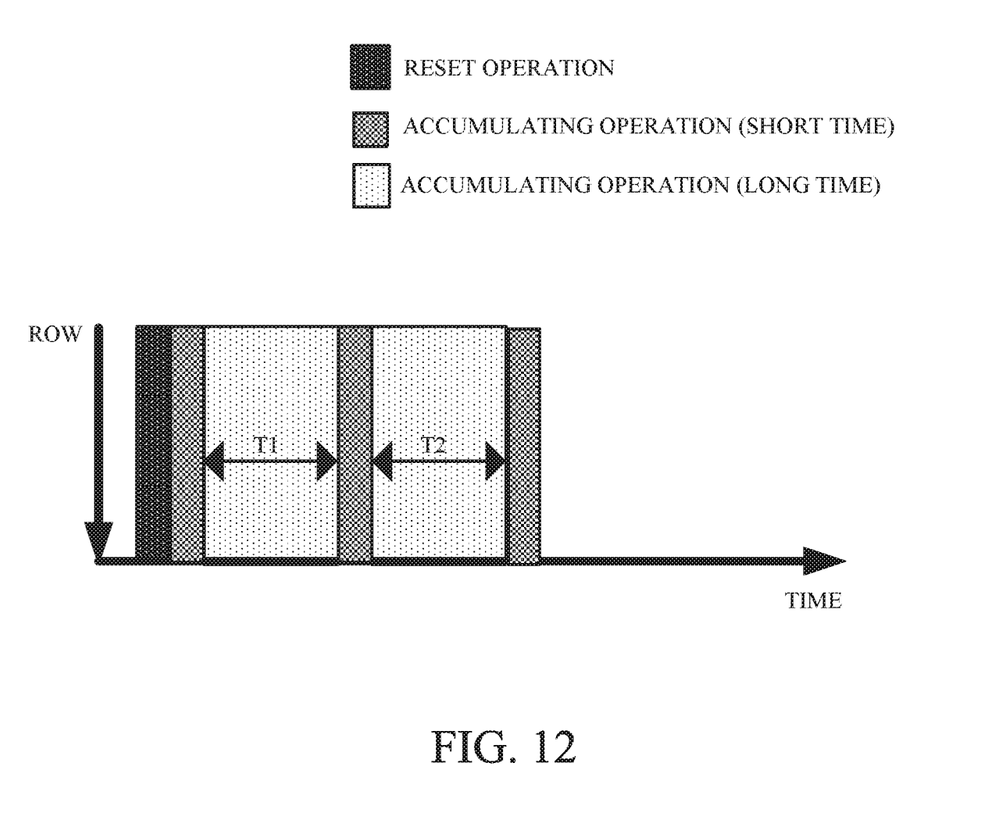
FIG. 12 is a schematic view of a charge accumulating operation according to the variation of the second embodiment.

FIG. 12 is a schematic view of an illustrative charge accumulating operation of the PD 1101. After the electric charge accumulating operation starts, the PD 1101 repeats a short accumulation and a long accumulation. The electric charges accumulated in the short accumulation are transferred to one pixel memory, such as the pixel memory 1104a, and sequentially read out. The electric charges accumulated in the long accumulation are transferred to the other pixel memory, such as the pixel memory 1104b. In this case, the transferred electric charges may be read out after the single transfer or multiple transfers. The example in FIG. 12 provides an image corresponding to the accumulation time T1+T2 by reading the electric charges after the two transfers. The above operation enables the images of both the short accumulation and the long accumulation to be acquired.

The structure according to this embodiment provides a high-quality image in accordance with the transfer condition by the correction processing described with reference to FIGS. 8A and 8B in the first embodiment. The correction coefficient may be changed for each transfer switch in addition to the transfer number.

As described above, the high-quality image can be obtained by changing the correction coefficient for the signal obtained according to the transfer condition of the electric charge transfer from the PD 901 to the pixel memories 1104a and 1104b as the electric chargers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-142106, filed on Jul. 21, 2017, which is hereby incorporated by reference herein in its entirety.

What is claimed is:

1. An image sensor comprising:
a unit pixel that includes a photoelectric converter configured to accumulate electric charges generated based on incident light, and an electric charger configured to store the electric charges transferred from the photoelectric converter;
a memory that stores instructions; and
a processor configured to execute the instructions stored in the memory to:
correct a signal corresponding to the electric charges output from the electric charger based on a transfer condition when the electric charges are transferred from the photoelectric converter to the electric charger, wherein the transfer condition is a transfer number from the photoelectric converter to the electric charger.

2. The image sensor according to claim 1, wherein the transfer condition is a voltage in a transfer from the photoelectric converter to the electric charger.

3. The image sensor according to claim 1, wherein the transfer condition is a slope of a transfer pulse in a transfer from the photoelectric converter to the electric charger.

4. The image sensor according to claim 1, wherein the transfer condition is a temperature in a transfer from the photoelectric converter to the electric charger.

5. The image sensor according to claim 1, wherein the corrector changes a correction coefficient used to correct the signal based on the transfer condition.

6. The image sensor according to claim 5, wherein the correction coefficient is a gain value used to correct a gain of the signal.

7. The image sensor according to claim 5, wherein the correction coefficient is an offset value used to correct an offset of the signal.

8. The image sensor according to claim 5, wherein the corrector changes the correction coefficient based on an area on an imaging plane in the image sensor.

9. The image sensor according to claim 1, wherein the electric charger includes a floating diffusion part.

10. The image sensor according to claim 1, wherein the image sensor includes a plurality of unit pixels, the electric charger is a memory part different from the floating diffusion part, and a plurality of photoelectric converters transfer electric charges at the same timing.

11. The image sensor according to claim 10, wherein the unit pixel includes a plurality of electric chargers.

12. An imaging apparatus comprising:
an image sensor that includes a photoelectric converter configured to accumulate electric charges generated based on incident light, and an electric charger configured to store the electric charges transferred from the photoelectric converter;
a memory that stores instructions; and
a processor configured to execute the instructions stored in the memory to,
correct a signal corresponding to the electric charges output from the electric charger based on a transfer condition when the electric charges are transferred from the photoelectric converter to the electric charger,
wherein the transfer condition is a transfer number from the photoelectric converter to the electric charger.

13. An imaging apparatus comprising:
an image sensor that includes a plurality of pixels, each pixel of the plurality of pixels having a photoelectric converter that accumulates electric charges generated based on incident light and a plurality of capacitors that store the electric charges transferred from the photoelectric converter and at least one processor or one circuit that corrects a signal corresponding to the electric charges output from the plurality of capacitors based on a transfer condition when the electric charges are transferred from the photoelectric converter to the plurality of capacitors,
wherein the transfer condition is a transfer number from the photoelectric converter to the plurality of capacitors.

* * * * *